United States Patent [19]

Lukacz

[11] Patent Number: 4,615,647
[45] Date of Patent: Oct. 7, 1986

[54] PNEUMATIC CONVEYING DEVICE AND FLAP VALVE

[75] Inventor: Stephen A. Lukacz, Nazareth, Pa.

[73] Assignee: Fuller Company, Bethlehem, Pa.

[21] Appl. No.: 703,960

[22] Filed: Feb. 21, 1985

[51] Int. Cl.⁴ .................. B65G 33/22; B65G 53/04
[52] U.S. Cl. .................................. 406/60; 198/671;
    414/218; 366/192; 100/147
[58] Field of Search .............. 406/56, 60, 61, 53;
    414/218; 198/670, 671; 415/74; 137/527.6,
    527.8; 100/147, 148; 366/192

[56] References Cited

U.S. PATENT DOCUMENTS

| | | | |
|---|---|---|---|
| 1,563,826 | 12/1925 | Bernert | 406/60 |
| 1,677,119 | 7/1928 | Kinyon | |
| 2,299,470 | 10/1942 | Davis | |
| 2,428,995 | 10/1947 | Rogers | 414/218 |
| 3,106,428 | 10/1963 | Lenhart | |
| 3,602,552 | 8/1971 | Morgan | |
| 3,704,917 | 12/1972 | Boyhont et al. | |
| 4,109,966 | 8/1978 | Boyhont et al. | |
| 4,525,106 | 6/1985 | DiBuo et al. | 406/60 |
| 4,558,985 | 12/1985 | Fischer et al. | 198/671 |

FOREIGN PATENT DOCUMENTS

| | | | |
|---|---|---|---|
| 0098340 | 1/1983 | European Pat. Off. | |
| 593486 | 2/1934 | Fed. Rep. of Germany | |
| 2110816 | 6/1972 | France | |
| 1101253 | 1/1968 | United Kingdom | |
| 700402 | 12/1979 | U.S.S.R. | 414/218 |

Primary Examiner—Joseph F. Peters, Jr.
Assistant Examiner—Mary Beth O. Jones
Attorney, Agent, or Firm—Frank H. Thomson

[57] ABSTRACT

A conveying apparatus includes a casing having a bore therethrough with an inlet for solid particulate material to be conveyed and an outlet. A screw impeller is rotatably mounted in the casing by front and rear bearings with the rear bearings being positioned near the inlet. Material is discharged from the casing through a coaxial outlet into a discharge chamber. Gaseous fluid under pressure is supplied to the discharge chamber for entraining and conveying the particulate material through a pneumatic conveying line which is flow connected to the outlet of the discharge chamber. A valve, which closes the outlet of the casing, is biased closed by a weight and opened by material being advanced by the screw impeller. The valve includes a valve plate with an opening which surrounds the shaft of the screw impeller and provides a seal at the casing to substantially prevent gaseous fluid from entering the casing. The valve plate is shaped so that it includes a first portion which defines half of the opening through the valve element and a second portion which defines the other half of the opening. The first portion is longitudinally spaced from the second portion so that when the valve pivots from a closed position to an open position, the edges of the opening adjacent the shaft will pivot away from the shaft at least during the initial stages opening valve.

20 Claims, 8 Drawing Figures

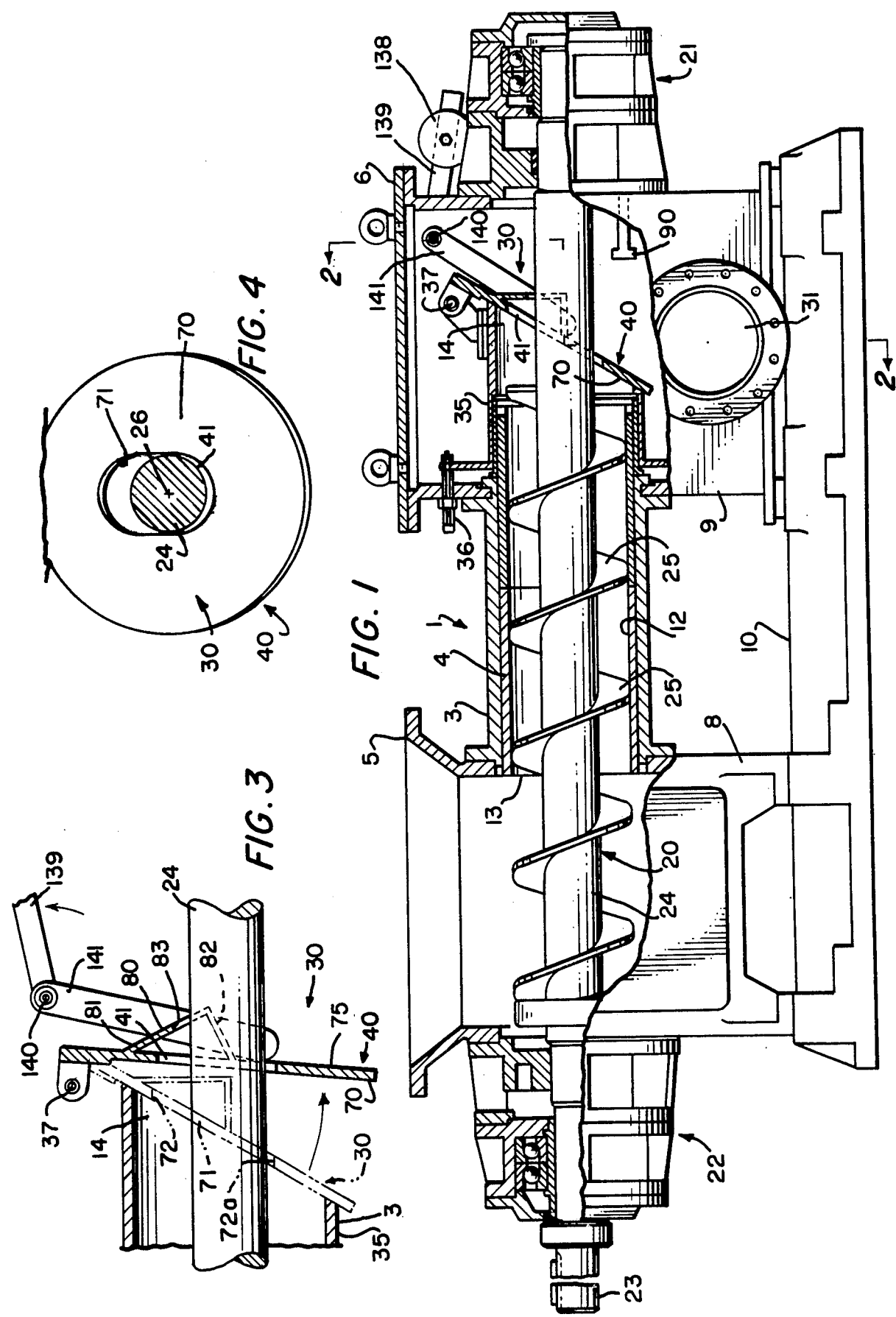

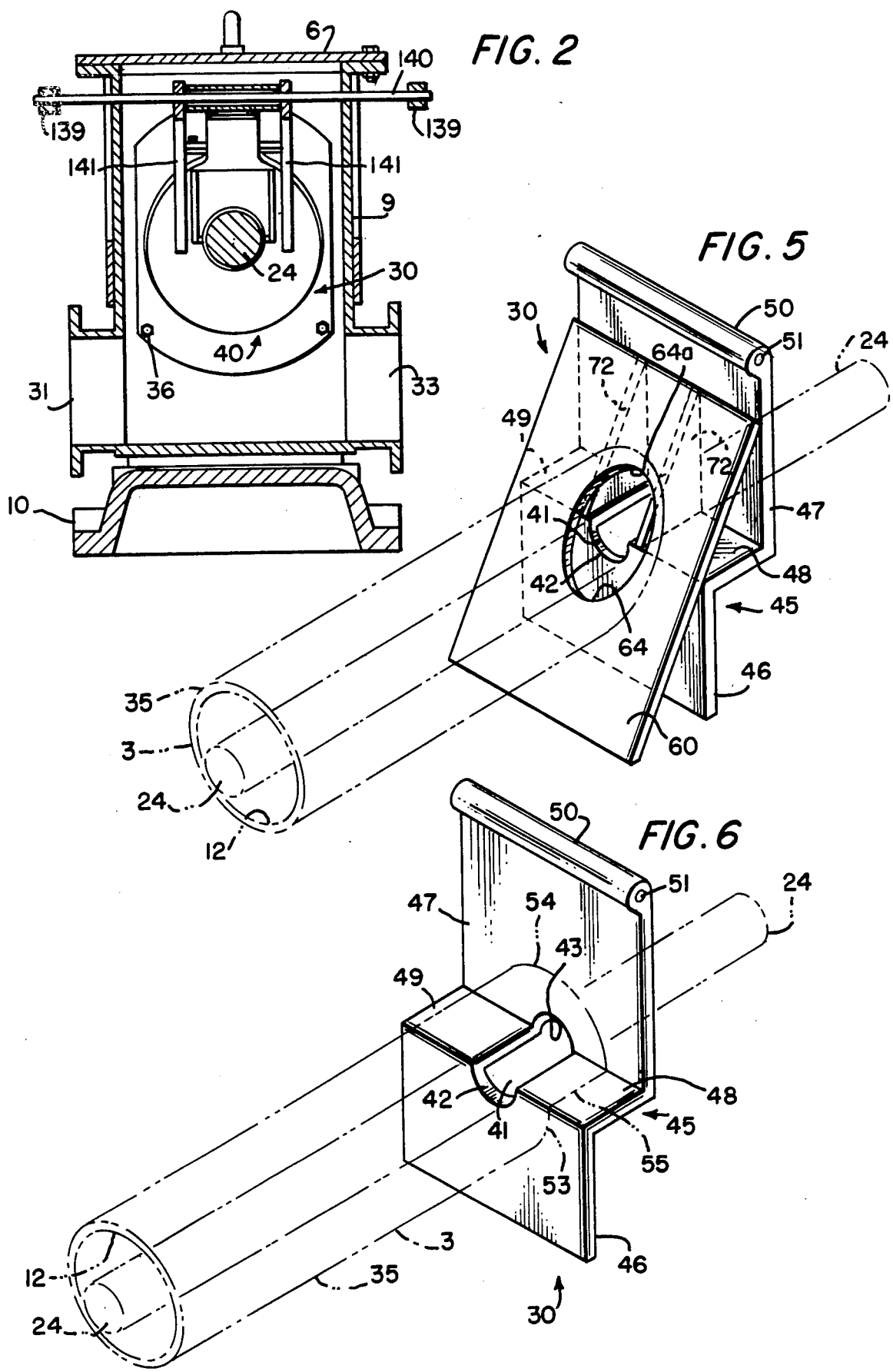

PNEUMATIC CONVEYING DEVICE AND FLAP VALVE

BACKGROUND OF THE INVENTION

The present invention relates to pneumatic conveying apparatus and in particular to a flap valve arrangement for use with a line charging device using a screw conveyor and discharge chamber for supplying solid particulate material to a pneumatic conveying line. The invention also relates to a valve for closing the outlet of a screw conveyor where the shaft of the screw impeller extends through the outlet.

Prior to the present invention it was generally known to provide pneumatic conveying and line charging devices for conveying solid particulate material including a screw impeller rotatably mounted within the bore of a casing for transporting the particulate material from a source such as a hopper to a casing outlet. A discharge chamber or wind box is flow connected to the casing outlet for receiving the particulate material. Gaseous fluid under pressure is supplied to the discharge chamber for entraining the particulate material and conveying such material out of the discharge chamber and through a pneumatic conveying line which is connected to the discharge chamber.

Early designs of pneumatic conveying apparatus of the type to which the present invention relates are generally known as shown in U.S. Pat. No. 1,677,119, issued July 10, 1928. This design employed a front and rear bearing to rotatably support the screw impeller at both ends. A compressing screw formed by either a reducing pitch screw or a reducing diameter casing bore or an increasing diameter screw impeller shaft or combination thereof serves to compact material within the casing bore to thereby form a seal of material in the casing between the material outlet of the casing and the material inlet of the casing. This material seal serves to prevent "blowback" from the discharge chamber into the feed material hopper, i.e. prevent air under pressure used for conveying material through the line from short-circuiting into the material feed hopper through the bore in the casing rather than conveying material through the pneumatic conveying line.

a later development in pneumatic conveying apparatus of the type to which the present invention relates is generally shown in U.S. Pat. No. 2,299,470, issued Oct. 20, 1942. In that apparatus, the front bearing supporting the screw impeller of the early design is eliminated. An overhung screw impeller is supported by a rigid rear bearing. The front end of the screw impeller is kept centered within the bore or pump barrel by employing a heavy impeller shaft and by keeping the barrel full of material. In this latter device, a weighted flap valve is used for closing the outlet of the casing. During initial start-up of the pump, material is conveyed by the screw impeller from the inlet toward the outlet of the pump barrel. The valve serves to assist in forming a material seal at the outlet by remaining closed until there is sufficient material build-up to form the seal and overcome the weight closing the valve. Once the material seal is formed, the flap valve will swing into the discharge chamber away from the casing outlet and remain open so long as material is being conveyed. The material seal prevents "blow back". If material flow through the outlet stops, the valve swings closed to seal the end of the pump barrel.

U.S. Pat. No. 1,677,119 had the advantage over U.S. Pat. No. 2,299,470 in that the pump screw was supported by bearings at both ends which permitted the pump barrel to be operated at less than full clapacity and provided smooth operation. The later patent had the advantage of the flap valve aiding in the preventing of blowback.

Attempts have been made to combine the advantages of both pumps by employing a flap valve to aid in the formation of a seal of material at the outlet of the pump barrel and continue to utilize front and rear bearings to support the pump screw. Such apparatus are shown for example in U.S. Pat. No. 3,704,917 issued Dec. 5, 1972, U.S. Pat. No. 4,109,966 issued Aug. 29, 1978, U.S. Pat. No. 4,525,106, French Patent Specification No. 7039326 published June 2, 1972 and European Patent Specification No. 098340 filed Jan. 4, 1983.

In some of the prior art a side discharge arrangement has been utilized where the seal is formed perpendicular to the screw shaft. While this arrangement has been successfully used, many operators prefer the outlet of the pump screw to be aligned with the pump barrel as shown in U.S. Pat. No. 2,299,470 and the outlet of the discharge chamber to be in line with the pump barrel. Prior attempts to utilize an aligned outlet such as in U.S. Pat. No. 3,704,917 and European Patent Specification No. 098340 have had difficulties because of the movement of the valve element along the shaft and the wear created by the abrasive material being conveyed.

With swinging valves such as disclosed in European Patent Specification No. 098340, in order to allow the valve to swing freely relative to the shaft of the screw impeller, it is necessary to make the hole through the valve oversized. This leaves large gaps between the valve element and the screw shaft which are a source of leakage of conveying air and material. This annular member if mounted to the shaft will rotate and contact the valve and cause wear. If the annular member is supported by some means from the stationary outer barrel it creates a material obstruction which is undesirable and is energy consuming. In order to overcome this an oversized annular member is mounted on the shaft to provide a sealing point for the valve element. It would be desirable to eliminate this arrangement.

Other valves such as that shown in French Patent Specification No. 7039326 and U.S. Pat. No. 1,563,826 utilize a valve which employs a slot to permit the valve element to swing on the screw shaft. This slot prevents the valve from closing the outlet of the pump barrel.

It is desirable to provide a pneumatic conveying device of the screw impeller type which utilizes a flap valve capable of closing an axially aligned outlet of the pump barrel where the screw impeller is mounted in both front and rear bearings. This can be done according to the present invention by utilizing a novel valve arrangement capable of sealing at both the casing and substantially seal around the screw shaft.

SUMMARY

It is the principle object of this invention to provide a pneumatic conveying device which utilizes a novel valve arrangement to obtain the advantages of some of the prior art pneumatic conveying devices of this type while eliminating their disadvantages.

It is another object of this invention to provide a novel valve for closing the outlet of a screw conveyor where the shaft of the screw conveyor extends through the outlet.

In general, the foregoing and objects will be carried out by providing in combination with a screw conveyor including a housing having an inlet at one end and an outlet coaxial with the housing at the other end and a screw impeller including a shaft extending through the outlet and a helical flight for advancing material from the inlet through the outlet through the housing when the screw impeller is rotated, an improved valve for closing the outlet of the housing comprising a valve element for sealing against the housing including an opening therethrough having a diameter larger than the diameter of said shaft; said valve element having a first portion which defines a first half of said opening and a second portion which defines a second half of said opening; said first portion being longitudinally spaced from said second portion toward the inlet of the housing; and means for pivotally mounting said valve element for movement relative to said housing and said shaft to permit said valve to be opened.

With the present invention, a novel valve arrangement has been provided to close the outlet of a screw conveyor in which the shaft of the screw conveyor extends through the outlet. The novel valve is capable of pivotal movement relative to the casing and the shaft. In the closed position, a seal is formed around the casing housing. The valve element is also designed to substantially seal around the screw shaft without interfering with rotational movement of the screw shaft and without requiring a complex enlargement on the screw shaft. This is accomplished by designing a valve element so that when the valve element pivots from a closed position to an open position the areas of the valve element adjacent the pump shaft pivot away from the shaft until the valve element reaches a position to permit material to freely flow out of the casing. The opening through the valve element is sufficiently large to permit the shaft to rotate freely and sufficiently small to substantially seal around the shaft in the closed position.

BRIEF DESCRIPTION OF THE DRAWINGS

The invention will be described in connection with the annexed drawings wherein:

FIG. 1 is a sectional view of a pneumatic conveying apparatus according to the present invention;

FIG. 2 is a sectional taken on the line 2—2 of FIG. 1 looking in the direction of the arrow;

FIG. 3 is a diagramatic view of the improved valve element according to the present invention shown in an open position;

FIG. 4 is a view of portion of the present invention looking from the inlet end of the pump casing toward the outlet;

FIG. 5 is a perspective view of the valve element of the present invention with the shaft of a screw conveyor and casing shown in phantom;

FIG. 6 is a view similar to FIG. 5 showing a modification of the present invention;

DESCRIPTION OF THE PREFERRED EMBODIMENTS

Figure 7:
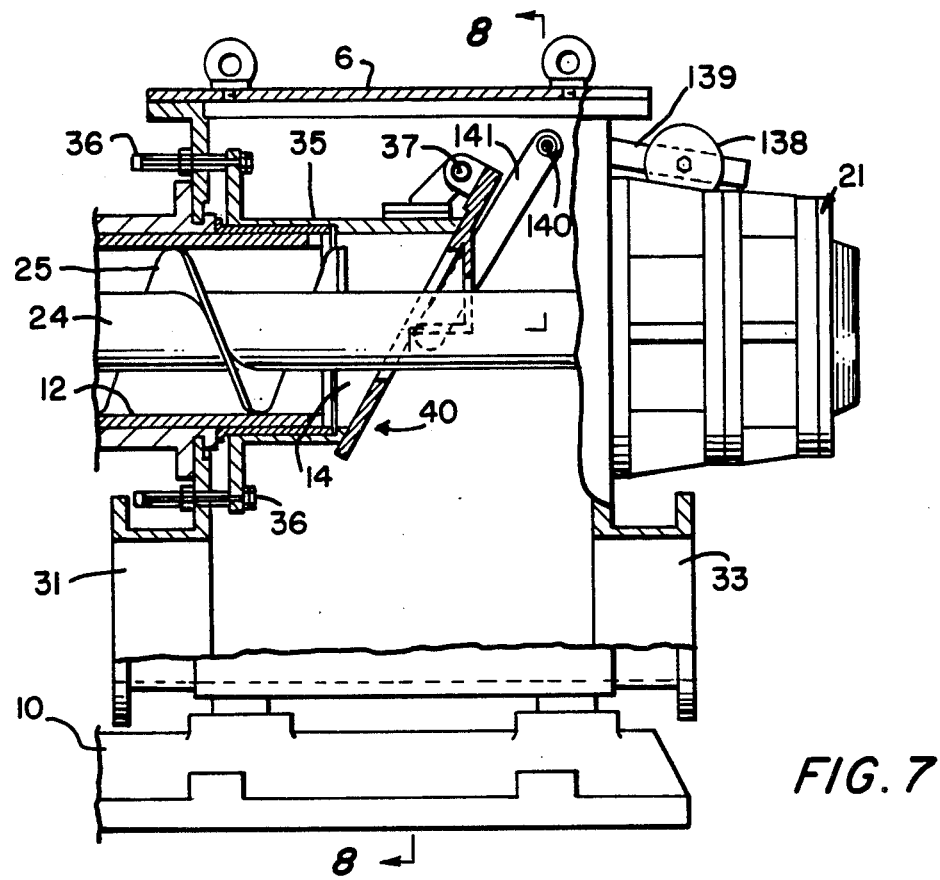
FIG. 7 is a view similar to FIG. 2 showing a modification of the present invention.

Referring to FIG. 1, there is shown a pneumatic conveying device or line changer according to the present invention which is intended for supplying solid particulate material from a source to a pneumatic conveying line where it will be conveyed by gaseous fluid under pressure to a remote location. The device includes a casing generally indicated at 1 formed by a hollow cylindrical portion 3 with a wear resistant liner 4. A material feed hopper 5 adapted to be connected to a source of material (not shown) is secured to the cylindrical portion 3 by any suitable means. A hollow portion 6 is connected to the other end of the casing 3 and serves as a discharge chamber to be described hereinafter. The hopper 5 is connected to a pedestal 8 and the discharge chamber 6 forms a pedestal 9 for supporting the casing 3 and the apparatus 1 on a base 10.

The casing 3 and wear resistant liner 4 define a bore 12 through the casing. The bore has an inlet 13 for solid particulate material to be conveyed which inlet 13 opens into the hopper 5. The casing 1 and the bore 12 also include a material outlet 14 which extends into in the section 6 and discharges material into the discharge chamber. The outlet 14 is coaxial with the bore 12.

A screw impeller generally indicated at 20 is rotatably mounted within the bore 12 of casing 3 by means of a forward bearing assembly generally indicated at 21 and a rear bearing assembly generally indicated at 22. These bearing assemblies are known in the art and are described in greater detail in U.S. Pat. No. 4,109,966. The impeller 20 includes a shaft 24 and a helical screw flight 25 also known in the art. The helical screw flight terminates near the outlet 14 of the barrel liner 4 while the shaft 24 extends through the outlet 14 to be supported by the bearing assembly 21.

A valve generally indicated at 30 is used for selectively closing the outlet 14 of the casing of the pump apparatus. This valve pivots from a closed position as shown in FIG. 1 and in phantom in FIG. 3 to an open position as shown in solid in FIG. 3. In accordance with prior art practice, this valve is intended to aid in the formation of a seal of material at the outlet 14 of the pump barrel to prevent "blow back" and to swing closed when material flow through the pump terminates.

During conveying operation, the screw impeller is rotated by suitable means such as a motor (not shown) connected to the end 23 of shaft 24 to advance material from the hopper 5 and inlet 13 through the casing bore 12. The material will compact against valve 30 to form a seal of material at outlet 14. When the valve 30 swings open, material is discharged from the outlet 14 into the discharge chamber 6. As is known in the art, gaseous fluid under pressure is supplied from a source (not shown) through an inlet 31 to the discharge chamber 6 where material which is discharged from the outlet 14 of the casing is entrained in the gaseous fluid under pressure and conveyed out of the discharge chamber through an outlet such as at 33 in FIG. 2 which is flow connected to a pneumatic conveying line (not shown). During the conveying of material, the screw impeller 20 continues to supply material to be conveyed and maintain the material seal at outlet 14. When material flow through the casing is reduced to the point where a material seal is not formed and where the pressure is not adequate to maintain the valve element 30 in an open position, the valve 30 will be swung closed by a weight mechanism to prevent the compressed gas from entering casing 1. In order to accomplish this, it is necessary to provide a valve element which is capable of sealing against the housing of the casing and to provide an adequate seal around the shaft 24.

In the embodiment shown in FIGS. 1 to 5, 7 and 8, the casing includes an extension 35 mounted by means of bolts 36 to the walls of the discharge chamber 6. This section 35 is cut on the bias so that the outlet 14 extends downwardly and inwardly toward the casing inlet as clearly shown in FIGS. 1, 3 and 7. The valve element 30 is pivotally connected at 37 to this extension 35.

The valve element of the present invention is a normally closed arrangement and includes a counterweight means 138 mounted on an arm 139 which is connected through shaft 140 to a crank arm 141 to urge the valve 30 to a closed position. In order to open the valve, sufficient pressure must be exerted by the material to be conveyed against the valve 30 to overcome the force of the weight 138. In this manner the seal of material is formed at outlet 14 in a manner known per se in the art.

The valve 30 surrounds the shaft 24 and includes a valve element generally indicated at 40 for sealing against the housing for the screw conveyor in general and in particular against the extension 35. The valve 30 has an opening 41 therethrough having a diameter larger than the diameter of the shaft 24 to thereby permit the shaft to freely rotate within the bore 12. The opening 41 is sufficiently small to at least particially close the outlet around the shaft 24 to substantially prevent material and gas leakage between the shaft 24 and valve element 30. It is important to the functioning of the present invention that the valve 30 be permitted to swing open to the greatest extent possible to allow material to be freely discharged from the bore 12 into the discharge chamber 6 without the edges of the opening contacting the shaft 24. This could be accomplished by making the opening large, but such a design would either result in large material/gas leakages around shaft 24 or require a special enlarged segment on the shaft 24 behind valve 30.

With the present invention a valve has been designed which permits the valve to swing open to permit material to be freely discharged from the screw conveyor housing. This is accomplished by designing the valve so that the edges of the opening immediately adjacent the shaft 24 of the screw impeller 20 swing away from the shaft 24 at least until the valve 30 is open an amount sufficient to material for material to be discharged from the boring 12 through outlet 14.

The concept of having the edges of the opening 41 move away from the widest part of the shaft rather than toward the shaft is accomplished by dividing the opening 41 into a first half 42 and a second half 43 with the first half being spaced longitudinally from the second half along the length of the shaft 24. In the embodiments shown the first half is the bottom half 42 of the opening and positioned longitudinally toward the casing inlet 13 from the second or top half 43. This is because the valve is pivoted at the top, but if the valve were pivoted at the bottom, the positions could be reversed.

The principle of the invention is easiest to visualize in FIG. 6. In this embodiment, the valve 30 is defined by a Z-shaped valve element 45. The flap 45 includes a first portion 46 has the lower or first half 42 of opening 41 therethrough and a second portion 47 which has the second or upper half 43 of opening 41 therethrough. Legs 48 and 49 connect the first portion 46 with second portion 47 and are spaced apart a distance equal to the diameter of opening 41. The second portion 47 includes a housing 50 having an opening 51 therethrough for pivotally mounting the valve 45 on shaft 140.

For use in combination with Z-flap 45 of FIG. 6, the outlet end 35 of casing 3 of the housing is stepped to include a first portion 53 which matches first position 46 of valve element 45 and a second position 54 which matches second portion 47. A horizontal section 55 matches the legs 48 and 49 so that in the closed position, the sections 46, 47, 48 and 49 seal against the ends of outlet 35 of casing 3 at 53, 54 and 55 respectively. The geometry of the design ensures that when the valve plate 45 swings away from the outlet of casing 3, the bottom half 42 of the opening 41 will swing away from shaft 24. Similarly, the second or top half 43 of the opening will also swing away from the diameter of shaft 24. The pivot point of the flap as defined by housing 50 should be forward of the first portion of the element 45.

In the embodiment shown in FIG. 5, a flat valve plate 60 has been placed on the Z-shaped flap 45. In order to support plate 60 ribs 72 have been added to legs 48 and 49. When the plate 60 is used the end of the casing is cut on the bias so that it slants downwardly and inwardly toward the inlet of the bore 12 similar to FIG. 1. In the embodiment of FIG. 5, the opening 41 through the valve 30 is defined by the lower half 42 and the upper half 43 in the same manner as the embodiment of FIG. 6. In FIG. 5, an enlarged opening 64 is included in plate 60. This opening is large enough so that its bottom half will swing away from shaft 24 and while its top half 64a will swing toward the shaft when the valve opens, the edge 64a is not immediately adjacent shaft 24 so contact will not occur.

Refering to FIGS. 1 to 4, a preferred form of the valve 30 is shown. In this embodiment the bottom leg 46 of the Z-flap 45 of FIGS. 5 and 6 has been eliminated but a flat valve plate similar to that shown in FIG. 5 is utilized but the plate may be circular. In the embodiment of FIGS. 1 to 4, the valve 30 includes a flat valve plate 70 having an oval shaped opening 71 therethrough. The oval opening is formed so that in the closed position, the walls or edges 72 of the opening 71 are parallel with shaft 24 of screw impeller 20; see FIGS. 1 and 3. The oval opening is also positioned so that its lower center of curvature is aligned with the axis 26 of shaft 24 when the valve 30 is closed; see FIG. 4.

An angle member 80 is mounted on the back of valve plate 70. This angle 80 includes a first leg 81 which, when the valve is closed, is substantially vertical and a second leg 82 which, when the valve is closed, is substantially horizontal. The second leg 82 is bifurcated so that it extends on opposite sides of the shaft 24. The angle member 80 has an opening 83 therethrough which is formed by a half circle opening in the leg 81 and the bifurcated or split leg 82. This opening is in close proximity or immediately adjacent to the top half of the shaft 24 when the valve is closed and combines with the lower half of opening 71 in plate 70 to define the opening 41 through the valve and surround the shaft 24 when the valve is closed to at least partially seal around the shaft. Thus, the valve of FIGS. 1 to 4 is similar to the valve of FIGS. 5 and 6 in that the bottom position 75 of plate 70 forms the first portion which defines a first half 42 of an opening 41 through the valve 30 and is similar to lower plate 46 of FIG. 6. The valve of FIGS. 1 to 4 has a second portion defined by angle member 80 in general and specifically leg 81 which defines a second half 43 of the opening 41 through the valve member and is similar to upper plate 47 of the valve of FIG. 6. In the embodiment of FIGS. 1 to 4, the first portion is spaced from the second portion longitudinally along the shaft 24. The second leg 82 of angle member 80 is similar to the legs 48 and 49 of FIGS. 5 and 6.

As in the case of FIGS. 5 and 6, when the valve 30 of FIGS. 1 to 4 swings from a closed position to an open position, the edges of the opening through the valve immediately adjacent the shaft swing away from the shaft until the valve is open by an amount sufficient to permit material to be fully discharged from the casing bore 3. This is approximately vertical as shown in FIG. 3. Of course, if the valve were to continue to swing open, the edges would swing toward the shaft. For this purpose, an adjustable stop 90 may be placed in discharge chamber 6. The edges immediately adjacent shaft 24 are defined by the lower half 72a of opening 71 in plate 70 and the upper half 83 in angle leg 81 and the space between the bifurcated leg 82 of angle member 80.

The total diameter of the total opening through the valve need be only slightly larger than the shaft 24 so that it is large enough to permit the shaft to rotate freely and small enough to form a labyrinth like seal around the shaft when the valve is closed. This means that a substantial seal is formed around the shaft and unlike European Patent No. 098340, it has been found that it is not necessary to include an elaborate sealing enlargement around the shaft 24 behind the valve 30.

Figure 8:
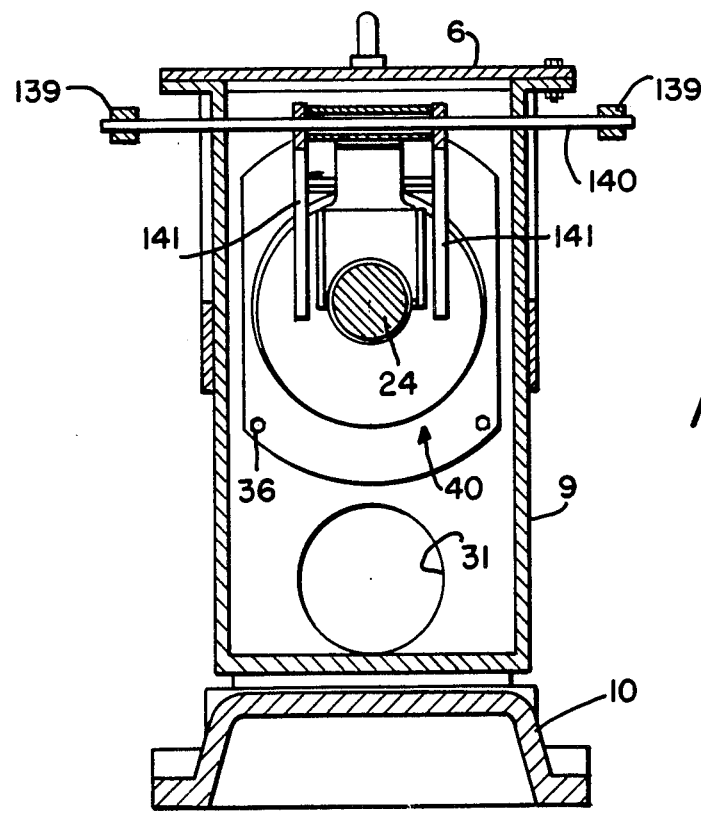
FIG. 8 is a sectional view of the embodiment of FIG. 7 taken on the line 8—8 of FIG. 7.

A further modification of the present invention is illustrated in FIGS. 7 and 8 wherein the inlet for gaseous fluid and outlet for gas and entrained solid particulate material is coaxially aligned with and spaced from the casing so that a front discharge arrangement is provided.

From the foregoing it should be apparent that the objects of the present invention have been carried out. A novel valve arrangement for a pneumatic conveying apparatus has been provided which valve element will seal against the housing wall and will also form a substantial seal around the screw shaft of an outlet which is coaxial with the bore. This will prevent blowback through the casing element when material is not being conveyed.

The valve elements 30 and 45 have been shown as a unitary construction. It should be understood, however, that the invention also contemplates a split construction such as making leg 46 a separate piece bolted to leg 48 or leg 47 bolted to leg 48. In addition, plate 70 could be divided into two or more pieces.

While the valve has been particularly designed for use with a pneumatic conveying or line charging device, it is also usable to close the outlet of any screw conveyor or any casing where a shaft extends through the outlet.

It is intended that the foregoing be a description of preferred embodiments and that the invention be limited solely by that which is within the scope of the appended claims.

I claim:

1. In combination with a screw conveyor including a housing having an inlet at one end and an outlet coaxial with the housing at the other end and a screw impeller including a shaft extending through the outlet and a helical flight for advancing material from the inlet to the outlet through the housing when the screw impeller is rotated, an improved valve for closing the outlet of the housing comprising a valve element for sealing against the housing including an opening therethrough having a diameter larger than the diameter of said shaft; said valve element having a first portion which defines a first half of said opening and a second portion which defines a second half of said opening; said first half being longitudinally spaced from said second half toward the inlet of the housing; and means for pivotally mounting said valve element for movement relative to said housing and said shaft to permit said outlet to be opened.

2. In the combination according to claim 1, the improved valve further comprising said means for pivotally mounting said valve element being positioned near said second portion and remote from said first portion so that said first portion moves through a greater arcuate distance than said second portion when said valve pivots from a closed position to an open position.

3. In the combination according to claim 1, the outlet of said housing being slanted downwardly and inwardly toward its inlet and said valve element is pivoted at the top.

4. In the combination according to claim 3, wherein said first half of said opening constitutes the bottom half of the opening and the second half of said opening constitutes the top half of the opening, said first portion including a flat plate for sealing against the housing and said second portion including an angle member mounted on said flat plate having a first leg which is substantially vertical when the valve is closed and defines said top half of the opening and a second leg which is substantially horizontal when the valve is closed.

5. In the combination according to claim 4 wherein said second leg is bifurcated and extends on diametrically opposite sides of said shaft.

6. In the combination of claim 2 wherein the outlet of housing is stepped and includes a first portion which is longitudinally spaced from a second portion and a horizontal section connecting the first portion and the second portion; the first portion of the valve element being adopted to seal against the first portion of the housing outlet and the second portion of the valve element being adopted to seal against the second portion of the housing outlet.

7. In an apparatus for conveying solid particulate material including a casing having a bore therethrough, an inlet for solid particulate material to be conveyed and an outlet coaxial with one end of the bore for discharging solid particulate material; a screw impeller having a shaft mounted in said bore in the casing for advancing solid particulate material from said inlet to said outlet; a pair of bearing means, each operatively connected to a respective end of the casing for rotatably mounting said screw impeller in said casing; a discharge chamber flow connected with the outlet of the casing for receiving solid particulate material from the casing having an inlet for gaseous fluid under pressure and an outlet adapted to be connected to a conduit for conveying solid particulate material away from the discharge chamber whereby solid particulate material advanced from said inlet for solid particulate material is discharged from said casing through said casing outlet into said discharge chamber and gaseous fluid under pressure supplied to said discharge chamber entrains the solid particulate material and conveys it through the material conduit to which it is connected, an improved means for selectively closing the outlet of the casing comprising a valve element surrounding the shaft of the screw impeller and pivotably mounted for swinging movement about an axis perpendicular to the screw impeller; said valve element being shaped and having an opening positioned therein so that the edges of said opening immediately adjacent the shaft of the screw impeller initially swing away from the shaft at least until the valve element is open sufficient to permit material to be discharged from the casing through the casing outlet.

8. In an apparatus for conveying solid particulate material according to claim 7, the improved means for closing the outlet of the casing further comprising the end of said casing at said outlet being dimensioned so that the bottom of said casing is closer than the top to the inlet of the casing.

9. In an apparatus for conveying solid particulate material according to claim 7, the improved means for closing the outlet of the casing wherein the end of the casing at the outlet is at an acute angle to the vertical so that the top of the casing is forward of the bottom in the direction of material flow and said valve element is sloping at an angle toward the inlet of the casing when the valve element is in the closed position.

10. In an apparatus for conveying solid particulate material according to claim 9 wherein said valve element including a first, substantially flat plate for engaging the outlet end of the casing when the valve element is closed and an angle member mounted on said flat plate; the opening through the valve element including an enlarged opening through the flat plate and a semicircular opening through the angle member; the enlarged opening and the semicircular opening being positioned in relationship to each other and to the shaft of the screw impeller so that the opening through the valve element is substantially circular and in close proximity to the shaft to at least partially seal around said shaft when the valve element is closed.

11. In an apparatus for conveying solid particulate material according to claim 10 wherein the enlarged opening has a lower center of curvature which is aligned with the axis of the shaft when the valve element is closed.

12. In an apparatus for conveying solid particulate material according to claim 11 wherein the angled member is shaped so that when the valve element is closed, one leg is horizontal and the other leg is vertical.

13. In an apparatus for conveying solid particulate material according to claim 12 wherein said valve element includes means for normally biasing the valve element closed and said valve element is opened by material being conveyed through the casing by the screw impeller.

14. In an apparatus for conveying solid particulate material according to claim 13 further comprising stop means for limiting the swinging movement of the valve element away from said outlet.

15. In an apparatus for conveying solid particulate material according to claim 14 wherein said means for biasing the valve element closed includes a weight operatively connected through linkages to said valve element.

16. A line charging device for use in supplying pulverulent material to a conveying line comprising a barrel having a material inlet to one end for material to be conveyed and a coaxial material outlet at the other end, an impeller rotatably mounted in said barrel for transporting material from said inlet through said barrel to said outlet, said impeller including a shaft extending through said outlet; a discharge housing mounted on the said other end for receiving material from the material outlet; said discharge housing having a gas inlet on one side adopted to be connected to a source of gaseous fluid under pressure and a gas and entrained material outlet on the other side adopted to be connected to a conveying line, and valve means normally closing said outlet and openable by material being transported through said barrel including a valve element having an opening therethrough sufficiently large to permit said shaft to freely rotate and sufficiently small to at least partially close the outlet around the shaft; said valve element having a first portion which defines a lower half of said opening and a second portion which defines an upper half of said opening; said first portion being longitudinally spaced from said second portion along the length of said shaft.

17. A line charging device according to claim 16 wherein the valve element is pivoted at its top and the first portion is longitudinally spaced toward the inlet from the second portion and said first portion is connected to the second portion by a longitudinal leg positioned on diametrically opposite sides of the shaft.

18. A line charging device according to claim 17 wherein the outlet of the barrel is stepped and includes a first portion which is longitudinally spaced from a second portion and a horizontal section connects the first and second portion; the first portion of the valve element being adopted to seal against the first portion of the barrel outlet when the valve is closed and the second portion of the valve element being adapted to seal against the second portion of the barrel outlet when the valve is closed.

19. A line charging device according to claim 16 wherein said valve element includes a flat plate for sealing against the barrel and defining the first portion and an angle member mounted on said flat plate having a first leg which is substantially vertical when the valve is closed and defines the second portion.

20. A line charging device according to claim 19 wherein the angle member includes a second leg which is substantially horizontal when the valve is closed and bifurcated and extends on diametrically opposite sides of the shaft.

* * * * *